United States Patent
Maes, Jr.

[15] 3,684,248
[45] Aug. 15, 1972

[54] FENCE GATE HANDLE

[72] Inventor: Robert E. Maes, Jr., Holland, Mich.

[73] Assignee: Maes Incorporated, Holland, Mich.

[22] Filed: July 9, 1971

[21] Appl. No.: 161,081

[52] U.S. Cl. .................................. 256/10, 256/39
[51] Int. Cl. ........................................... A01k 3/00
[58] Field of Search .......... 256/10, 37, 39; 49/58, 59, 49/70; 160/328

[56] References Cited

UNITED STATES PATENTS

| 608,344 | 8/1898 | Nesmith | 256/39 UX |
| 2,306,661 | 12/1942 | Gengler | 256/10 |

FOREIGN PATENTS OR APPLICATIONS

| 726,676 | 3/1955 | Great Britain | 256/10 |

*Primary Examiner*—Dennis L. Taylor

[57] ABSTRACT

A gate handle for providing an opening in an electrified fence, including a hollow plastic housing flared at both ends and having an end wall at one end. An elongated tubular plunger is disposed in said housing and extends through an opening in said end wall by which the plunger is supported for axial sliding movement with respect to the housing. Said plunger has a radially outwardly extending flange on the interior end thereof which slidably engages the housing. A coil spring is disposed within one end of the plunger. A hook and an eyelet, which are at opposite ends of the housing, have elongated shanks secured to the opposite ends of the spring. The eyelet shank slidably extends axially through the exposed end of the plunger, and the hook shank extends through a closure member secured to the housing at the end thereof opposite the end wall. The plunger has an axially and radially extending slot for assisting in the assembly of the spring, plunger, hook and eyelet.

8 Claims, 7 Drawing Figures

PATENTED AUG 15 1972          3,684,248

INVENTOR
ROBERT E. MAES, JR.
BY
ATTORNEYS

FENCE GATE HANDLE

FIELD OF THE INVENTION

This invention relates in general to a gate handle and, more particularly, relates to a gate handle adapted to provide an opening in an electrified fence.

BACKGROUND OF THE INVENTION

Electric fences have long been in use for the purpose of keeping animals, particularly domestic farm animals such as cattle, within certain areas, such as pastures, or outside of crop producing lands. Such electrified fences are ordinarily arranged by stringing a bare electrical wire around the perimeter of the area and mounting the wire on insulators secured to the posts. An electrical power source is connected between the wire and the ground so that any electrically conductive object, such as an animal, coming in contact simultaneously with both the wire and the ground will receive an electrical shock, usually one of sufficient magnitude to be painful, but not strong enough to cause an injury.

Electrified fencing of the type described is clearly advantageous in fencing long boundaries in that customarily a single wire placed at a judicious height, considering the type of animals to be kept from moving across the boundary, will normally suffice as an effective barrier whereas non-electrified fencing normally requires a number of strands of wire, often one or more of them barbed, to effectively prevent movement of animals across the boundary. Thus, the savings in wire cost, installation costs and maintenance may be substantial with an electrified fence.

However, it is necessary to have passageways through the fence for authorized persons, such as farm personnel. To maintain the effectiveness of the electrified fence along its length, care must be taken to maintain electric continuity along the length thereof. Thus, if a conventional rigid hinged fence gate is employed, to allow access through the fence, care must be taken to provide adequate electrical contacts on the gate and on the fence so that the electrical continuity of the fence will be preserved when the gate is closed. Such understandably becomes cumbersome and expensive with conventional rigid gates. Moreover, access may be desired across the boundary at a plurality of points rather than a single point, thereby making the cost of conventional rigid swinging gates, particularly those equipped with suitable releasable electrical connectors, prohibitively expensive.

As a result, devices have been developed to circumvent the need for a conventional rigid gate at each point at which it is desired to move from one side of the fence to the other and such has normally been carried out in the past by the use of a releasable connector interposed in a gap between two sections of the electrically conductive fence wire, such devices conventionally being manually engageable to effect a separation and then a reconnection of the opposed, spaced wire ends.

However, prior devices of this type have not been fully satisfactory for this purpose. For example, certain prior devices of this type have been unduly complex in construction, hence, expensive. Other related devices have been difficult to operate, requiring the use of both hands of the operator or substantial strength. Moreover, some prior devices have often been of relatively fragile construction and, thus, frequently require repair or replacement. Such devices further have often been of a character to subject the user, particularly if not careful, to an electrical shock, either by reason of the lack of proper insulation, or due to the relationship of the manually grippable portion thereof with the electrically conductive portions thereof. Such devices further have often become unreliable, particularly after a substantial number of cycles of use under long periods of exposure to adverse weather conditions.

Accordingly, the objects of this invention include provision of:

A gate handle capable of providing both a physical and an electrical opening in an electrified fence and, more specifically, of releasably connecting together two spaced sections of an electrical fence wire.

A gate handle, as aforesaid, incorporating a hook and eye connection to and between such spaced ends of electrical fencing wire and which may be gripped by the user without receiving electrical shock and in which substantial protection is provided against slippage of the user's hand along the external, manually grippable portion of the handle into contact with an electrified fence wire or other electrical conductor connected thereto.

A gate handle, as aforesaid, in which the hook and eye elements engaging the spaced fenced wire ends are resiliently urged toward each other but may be moved away from each other in such a manner as to allow disconnection of the hook from the corresponding end of the fence wire and to allow reconnection in a reverse manner and without the need for substantial strength.

A gate handle, as aforesaid, in which the resilient means tensioning the fence wire engaging elements is fully housed within a weather proof housing and is substantially protected from the corrosive effects of adverse weather conditions.

A gate handle, as aforesaid, in which the tolerances between relatively movable parts are large and are not critical.

A gate handle, as aforesaid, which can be easily and rapidly assembled from relatively few parts by the interlocking of two parts can be released to disassemble the gate handle if necessary, the gate handle being operative even without the presence of the interlocking feature.

Other objects and purposes of this invention will be apparent to persons acquainted with apparatus of this general type upon reading the following specification and inspecting the accompanying drawings.

SUMMARY OF THE INVENTION

The objects and purposes of the invention are met by providing a gate handle capable of furnishing an opening in an electrified fence including a hollow plastic housing engageable as a hand grip. An elongated tubular plunger extends through an opening in a wall near one end of the housing and is supported for axial sliding movement with respect to the housing by such end wall and by a radially outwardly extending flange on the interior end of the plunger. A coiled spring is disposed mainly within the plunger and is connected at its opposite ends to the shanks of a hook and eyelet. The elongated shanks extend through the opposite ends of the housing. The eyelet shank extends axially into the exposed end of the plunger in slideable relation therewith, and the hook shank extends through a closure member secured to the housing at the end thereof opposite the end wall. The plunger has an axially and radially extending slot for assisting in the assembly of the spring, plunger, hook and eyelet within the housing.

DETAILED DESCRIPTION

Figure 1:
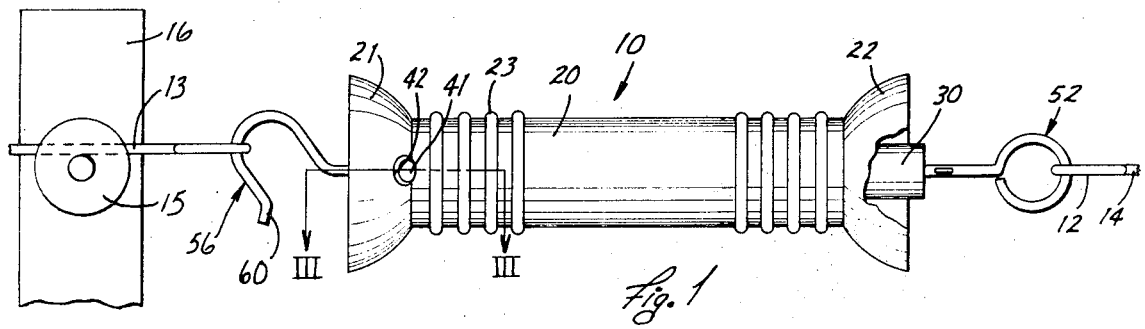
FIG. 1 is a side elevation view of a gate handle embodying the invention and showing connection thereof to the opposed ends of two spaced sections of an electrical fencing wire.

FIG. 1 discloses a gate handle 10 embodying the invention shown in its closed position, interposed between loops 11 and 12 formed at the opposed spaced ends of two sections 13 and 14, respectively, of electrically conductive fence wire. The wire section 13 is preferably attached, as by means of a conventional insulator 15, to a fence post 16 or the like so that the loop 11 thereof is preferably supported in a substantially fixed position. It will be understood that the other wire section 14 will normally be similarly attached at a point spaced from the loop 12 by an insulator to a fence post (not shown) whereby disengagement of the gate handle 10 from the wire loop 11 will enable the operator to move the wire section 14 out of the space between the two fence posts.

The gate handle 10 includes a hollow cylindrical housing 20, which is electrically nonconductive preferably fabricated from a plastic material that is relatively rigid and not easily broken. The ends of the housing 20 are provided with integral, axially and radially projecting, coaxial end bells 21 and 22 (FIGS. 2 and 3) defining frustrums of spheres. The end bells 21 and 22 obstruct movement of the hand of the user off the ends of the housing 20 and into contact with either the fence wire or exposed, electrically conductive portions of the gate handle 10. To further oppose movement of the hand of the user along the housing 20, the latter may be provided with a plurality of annular ridges 23 thereon.

Figure 2:
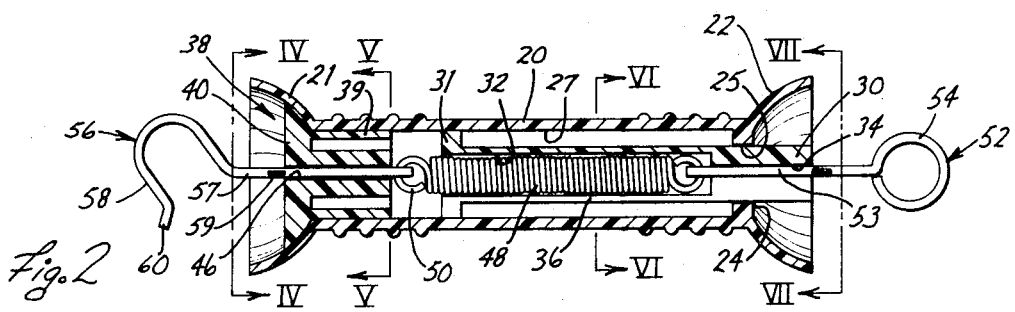
FIG. 2 is a central cross sectional view of the gate handle of FIG. 1.
Figure 3:
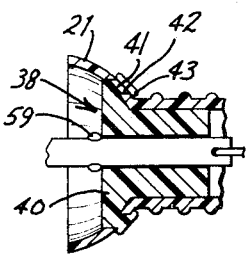
FIG. 3 is a fragmentary sectional view substantially as taken on the line III—III in FIG. 1.
Figure 4:
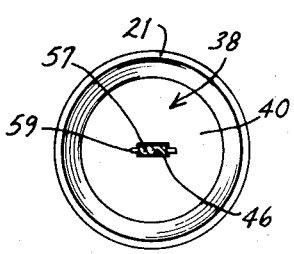
FIG. 4 is a sectional view substantially as taken on the line IV—IV in FIG. 2.
Figure 5:
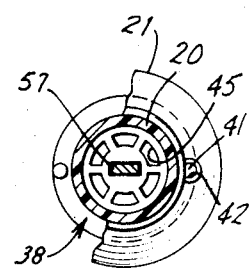
FIG. 5 is a partially broken, sectional view substantially as taken on the line V—V in FIG. 2.
Figure 7:
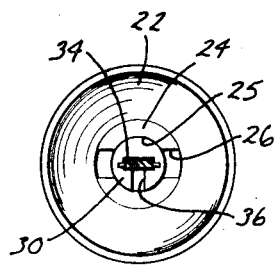
FIG. 7 is a sectional view substantially as taken on the line VII—VII in FIG. 2.

As seen in FIG. 2, the rightward end of the housing 20 has a radial end wall 24, which may be at the inner end of the end bell 22. The end wall 24 has a circular central opening 25 and a pair of diametrically opposed radially outwardly extending slots 26 (FIG. 7) which extend from said opening 25.

Figure 6:
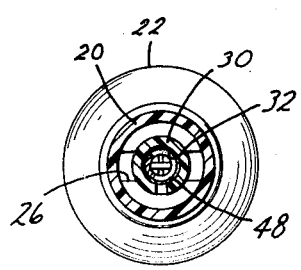
FIG. 6 is a sectional view substantially as taken on the line VI—VI in FIG. 2.

An elongated, cylindrical plunger 30, preferably of the same material as the housing 20, is insertable into the housing 20 from the leftward end thereof, the rightward end of the plunger being snugly but freely slidably receivable through the central opening 25 in wall 24. The leftward (inner) end of the plunger 30 is provided with an annular flange 31 which extends radially outwardly into snug but freely slidable engagement with the interior peripheral wall 27 of the housing 20. An elongated, cylindrical and preferably circular recess 32 (FIGS. 2 and 6) extends coaxially leftwardly from a point near the rightward end of the plunger 30 and opens through the leftward end thereof. A coaxial opening 34 (FIGS 2 and 6) extends from the rightward end of the recess 32 through the rightward end of the plunger 30. The opening 34 is preferably of rectangular cross section. A radially extending slot 36 extends the full length of the plunger 30 and communicates with both the recess 32 and the opening 34. The slot 36 is provided as an aid in the assembly of the gate handle 10 as hereinafter described.

A guide plug 38 (FIGS. 2, 3, 4 and 5), which is preferably made of the same material as the housing 20 and plunger 30, has an inner or rightward cylindrical portion 39 which is snugly but slidably receivable into the leftward end of the housing 20. The guide plug 38 is further provided, at its leftward end, with a radially enlarged head 40 preferably having a flat, leftward axial end surface and a frustum of a sphere on the rightward face which conforms to the interior of the end bell 21 and is adapted to bear rightwardly thereagainst to limit entrance of the guide plug into the housing 20.

The head 40 (FIG. 3) is provided with a pair of axially extending, integral pins 41 spaced radially from the axis of the plug 38 by a distance exceeding the radius of the exterior of the housing 20. The pins 41 are adapted to be received rightwardly through corresponding openings 42 which extend through the end bell 21 at locations corresponding to the pins 41. In the particular embodiment shown, the guide plugs 42 are thermoplastic material. Thus, by heating the exposed rightward ends of the pins 41 same may be melted somewhat to form a head 43 (FIG. 3) which lies snugly against the opposed surface of the end bell 21 and prevents unintended leftward movement of the guide plug 38 out of its installed condition.

A plurality of elongated recesses 45 extend into the cylindrical portion 39 of the guide plug 38 from the rightward end thereof. The recesses 45 lighten the weight of the guide plug and improve the radial resiliency of the cylindrical portion 39 so as to enable it to be readily inserted into the leftward end of the housing 20 and yet achieve a snug fitting relation therewith without requiring close tolerances in manufacture.

A central opening 46, preferably of uniform rectangular cross section, extends coaxially through the guide plug 38.

Electrically conductive, elongate and resilient tensioning means, such as a spiral spring 48, is slidably disposed within the recess 32 of the plunger 30. The spring 48, which extends the full length of, and slightly out of, the recess 32, has at both ends thereof conventional eyelets 50.

An eyelet 52 is formed of an electrically conductive and corrosion resistant material, such as aluminum. The eyelet is preferably of a relatively flat, rectangular cross section and includes an elongate shank 53 adapted to snugly but slidably extend through the opening 34 in the rightward end of the plunger 30. The leftward end of the shank 53 is provided with a transverse hole (not shown) for receiving the eyelet 50 on the rightward end of the spring 48. The rightward end 54 of the eyelet 52 is substantially circular to provide a ring connectable to the loop 12 of the fence wire 14.

A hook 56, preferably formed of the same material as the eyelet 52, includes a shank portion 57 snugly but slidably receivable axially through the opening 46 in the guide plug 48 so as to extend into the interior of the housing 20. The inner end of the shank 57 is provided with a transverse hole (not shown) for engagement by the rightward end 50 of the spring 48. Thus, movement of the eyelet 52 and hook 56 axially away from each other will result in stretching of the spring 48. The hook 56 includes a head 58 which extends leftwardly of the housing 20 and is adapted for releasable engagement with the loop 11 in the fence wire 13.

The shanks 53 and 57 of the eyelet 52 and hook 56 are provided, adjacent their outward ends, with laterally extending ears 59 and 60, respectively, preferably formed by a staking operation on the material of the shank. The ears 59 and 60 limit movement of the respective shanks 53 and 57 axially inwardly of the plunger 30 and guide plug 38, respectively.

OPERATION

Although the operation of the mechanism described above will be understood by skilled persons from the foregoing description, a summary of such description is now given for convenience.

To assemble the gate handle 10, the spring 48 may first be connected by its right end hook 50 to the inner end of the shank of the eyelet 52. The right end of the spring 48 is moved axially into the recess 32, with the shank 53 angled transversely thereto and extending out of the slot 36 of the plunger 30, until the rightward end of the spring 48 bottoms in the recess 32. The shank 53 is then pivoted into axial alignment within the opening 34 afterwhich the shank 53 is rotated through 90° into its operating position.

The material and shape of the plunger 30 are such that the plunger yields to widen the slot during rotation of the shank 53. However, the plunger 30 is sufficiently rigid as to oppose unintended removal of the shank 53 from the opening 34 by a reversal of the above-described assembly process. Moreover, the material of the plunger 30 is sufficiently rigid as to prevent axial inward movement of the shank 53 with respect to the plunger 30 beyond the point at which the ears 60 engage the rightward end of the plunger.

The shank 57 of the hook 56 is then urged through the opening 46 in the guide plug 38 until the ears 59 contact the leftward face of the guide plug. The inner end of the shank 57 is then engaged with the leftward hook 50 of the spring 48.

To place the above-mentioned internal components within the housing 20, the eyelet 52, plunger 30, spring 48 and the rightward ends of the guide plug 38 and hook shank 57 are fed sequentially into the leftward end of the housing 20. As the circular end portion 54 approaches the end wall 24 of the housing, the former is aligned with the diametral slots 26 to allow movement of the eyelet 52 through said end wall 24. The rightward end of the plunger 30 extends through the end wall opening 25 of the housing 20 and, by reason of the connection of the spring 48, the guide plug 38 contacts the end bell 21. The guide plug 38 is secured to the leftward end of the housing by upsetting the ends of the pins 41 extending through the holes 42 in the end bell 21.

The gate handle 20 may be installed in an opening between the electric fence wires 13 and 14, by securing the ring-like end portion 54 of the eyelet 52 to the loop 12 formed in the leftward end of the wire 14. The head end of the hook 56 is then engaged with the loop 11 in the end of the wire 13.

If the spacing of the loops 11 and 12 is correct, engagement of the hook 56 with the loop 11 will require the installer to firmly grip the housing 20 and move same leftwardly against the resistance of the spring 48 and with respect to the eyelet 52 in order to bring the hook 56 into engageable relationship with the eyelet 11.

Referring to FIG. 2, it will be seen that such leftward movement of the housing 20 with respect to the eyelet 52 also causes the housing 20 to move leftwardly with respect to the plunger 30 in which the rightward end of the spring 48 is housed so that the plunger 30 and eyelet 52 extend further rightwardly from the housing 20. The relative separating movement between the housing 20 and eyelet 52 tensions the spring 48 and extends same, causing the ears 59 of the hook shank 57 to bottom against the leftward end face of the guide plug 38. Thus, the hook 56 then moves leftwardly with the housing 20 thereby increasing the distance between the hook 56 and eyelet 52 to enable the gate handle 10 to bridge the distance between the opposed loops 11 and 12 in the fence wires 13 and 14 and thus to effect engagement therebetween.

It is preferred that, when the gate handle 10 is installed as shown in FIG. 1, some tension exists on the spring 48 in order to maintain good electrical contact between the two wires.

To effect an opening of the gate, or in other words a release of the gate handle 10 from the electric fence wire 13, the housing 20 is again gripped by the user and moved leftwardly for causing a leftward movement of the hook 56 until it can be disengaged from the fence loop 11.

It is preferred that the hook 56 engaged portion of the fence, here the loop 11, be firmly supported. Thus, the loop 11 is located close to a support for the wire 13, such as the post 16 and insulator 15. Thus, there is no need for the user to grasp the wire 13 in order to engage or remove the hook 56 with respect thereto, thereby avoiding the electrical shock hazard.

The tensioning element 48 and all electrical contacts between conductive elements, except for the contact with electrical fence wires themselves, are located within the housing 20 and, thus, are protected from the weather so as to minimize the possibility of corrosion.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A gate handle for electrically connecting a pair of spaced fence wires, comprising in combination:
   tensioning means;
   first and second elements engageable with the opposite ends of said tensioning means and having portions engageable with said opposed fence wires;
   a hollow housing telescoped over and loosely surrounding said tensioning means and the connected portions of said first and second elements;
   a plunger slideably telescoped within one end of said housing, said plunger being hollow and having spaces therewithin for receiving portions of said tensioning means and said first element;
   hollow plug means telescoped over an intermediate portion of said second element and receivable in the opposite end of said housing;
   whereby movement of said housing axially away from said first element carries said second element therewith for engaging or disengaging the adjacent one of said fence wires.

2. The device of claim 1 in which said fence wires are electrifiable and said tensioning means and first and second elements are electrically conductive, the connection of said first and second elements to said tensioning means effecting electrical contact between said elements, at least said housing being of electrically insulated material for protecting a user gripping said handle from electrical shock when said gate handle is used in connection with an electrified fence.

3. The device of claim 1 in which said housing has a radially inwardly extending wall adjacent one end thereof, said one end being adjacent said first element, said end wall having a central opening for snugly but slidably receiving said plunger therein, said plunger having a radially outwardly extending flange adjacent the ends thereof remote from said first element, said flange lying in snug but slideable contact with the interior of said housing, the length of said plunger exceeding the distance between said plug and said housing end wall, axial interference of said end wall and said flange preventing movement of said plunger out of said housing past said end wall.

4. The device of claim 1 in which said plunger has an axially extended recess opening through the end thereof adjacent said plug, an opening substantially coaxial with said recess and communicating therefrom through the other end of said plunger, said plunger also having a radial slot extending through the length thereof and in communication with said recess and said coaxial opening, said recess receiving said tension means in slidable relation therein and said coaxial opening receiving therethrough a shank portion of said first element in slidable relation therewith, said slot being of lesser width than the diameter of said recess and said coaxial opening, said plunger being of substantially rigid material but having sufficient resiliency as to allow movement of said shank portion axially therealong then radially inwardly into said coaxial opening during the installation of said first element and said tension means within said plunger, said first element having stop means thereon spaced outwardly of the ends of said plunger for preventing axial movement of said first element through said coaxial opening and through said recess.

5. The device of claim 1, in which said housing is equipped adjacent the ends thereof with radially outwardly extending guard means to prevent the hand of the user from slipping along said housing and axially off therefrom, said end plug having a shank portion snugly axially receivable in the adjacent end of said housing and a head portion at the outer end thereof which is radially enlarged and conforms in shape to the adjacent one of said end guards for reception axially therein and against.

6. The device of claim 5, including a hole extending substantially axially through said end guard radially outwardly of the portion of the housing between said end guards and a substantially axially extending pin on said head of said end plug, said pin being receivable through said hole in said end guard, said pin being of a deformable material and in the assembled condition of said gate handle being enlarged to prevent unintended withdrawal of said end plug from said housing.

7. The device of claim 1, in which said housing has a radially inwardly extending end wall adjacent said first element and an opening in said end wall sized for snug but slideable reception of said plunger therethrough, said end wall being further provided with radially outwardly extending slots, said first element having an enlarged head adapted for engagement with the corresponding one of said fence wires, the dimension of said head at least in one plane being greater transversely than is said opening in said end wall, said head being configured for axial sliding movement by proper circumferential orientation with said slots through the slotted portion of said opening in said end wall for allowing withdrawal of said plunger, tension means and first element outwardly through said opposite end of said housing.

8. The device of claim 1 in which the outer ends of said first and second elements terminate respectively in means not normally releasable from one adjacent fence wire and in means readily releasable from the other adjacent fence wire upon relative movement with respect thereto including an axial motion component, means on said second element for limiting movement thereof interiorly of said end plug and means on said end plug for limiting movement thereof interiorly of said housing, whereby movement of said housing away from said first element of magnitude sufficient to stretch said tensioning means causes a corresponding movement of said second element, whereby said second element can be engaged or disengaged from said other adjacent fence wire.

* * * * *